June 6, 1972  S. D. KATZ ET AL  3,667,722
PROPORTIONAL VALVE
Filed Oct. 22, 1970

Inventors:
Sherwin D. Katz
Joseph M. Levon
By Hofgren, Wegner,
Allen, Stellman & McCord
Attys United States Patent Office 3,667,722
Patented June 6, 1972

3,667,722
PROPORTIONAL VALVE
Sherwin D. Katz, Skokie, and Joseph M. Levon, Arlington Heights, Ill., assignors to I-T-E Imperial Corporation
Filed Oct. 22, 1970, Ser. No. 83,062
Int. Cl. F16k 31/10
U.S. Cl. 251—30
10 Claims

ABSTRACT OF THE DISCLOSURE

A proportional variable flow control valve including a piston type main valve member having a pilot valve slidable axially therein that controls the pressure drop across the main valve and hence the opening of the main valve. The piston type main valve forms a chamber in the main valve housing that is continuously pressurized by inlet fluid thereby tending to close the valve, and the ball valve is positioned to relieve pressure in this chamber to permit opening of the valve under a constant inlet fluid biasing force acting on the valve. An actuator is provided for the ball pilot valve that shifts the ball valve in an amount proportional to the desired flow rate through the main valve and in response to the differential pressures the main valve opens a corresponding amount.

BACKGROUND OF THE PRESENT INVENTION

There have in the past been provided many types of proportional flow control valves. These valves generally function to provide a flow output proportional to an input signal. In the present valve construction the input signal takes the form of incremental movement of an actuator plunger by a proportional solenoid, electrical device. Prior pilot operated proportional flow valves have been extremely complicated in construction, have had poor seating and sealing characteristics, and have generally not had a linear response between input signal and output flow.

It is a primary object of the present invention to overcome these problems in prior art proportional flow control valves and provide a proportional control valve of simple construction that is reliable and provides an extremely accurate relationship between control input and output flow rate.

SUMMARY OF THE PRESENT INVENTION

In accordance with the present invention, a proportional flow control valve is provided that is pilot operated by a ball valve slidable within and engageable with a seat in the main valve member. The main valve member is hollow and piston-like in construction and defines in the housing a chamber at one end of the valve that continuously communicates with inlet fluid pressure thus tending to close the valve member and move it axially toward a closed position. An exterior surface on the main valve member is continuously exposed to inlet fluid pressure tending to open the valve.

The ball valve, slidable in the main valve, selectively provides communication between the valve outlet and the chamber defined by the valve to selectively vent the chamber and lower the pressure therein in a manner to reduce the closing force on the main valve member.

Thus, there are two forces tending to open the main valve member, one a continuous hydraulic force by inlet fluid and the other being the force of outlet fluid acting on the end of the valve member, when the outlet is pressurized. Fluid within the chamber defined by the valve tends to close the valve.

A plunger actuator is provided for opening the ball valve within the main valve and selectively communicating the chamber with the outlet in pilot fashion to reduce the pressure in the chamber. The present valve is thus a differential pressure operated valve and assumes a position proportional to the actuated position of the ball valve. After the valve is open, it may be further opened by moving the ball valve further away from its seat and thereby further decreasing the chamber pressure and permitting the main valve to open even further in an amount proportional to the amount of input signal movement to the ball valve.

DETAILED DESCRIPTION OF THE PREFERRED EMBODIMENT

Figures 1, 2:
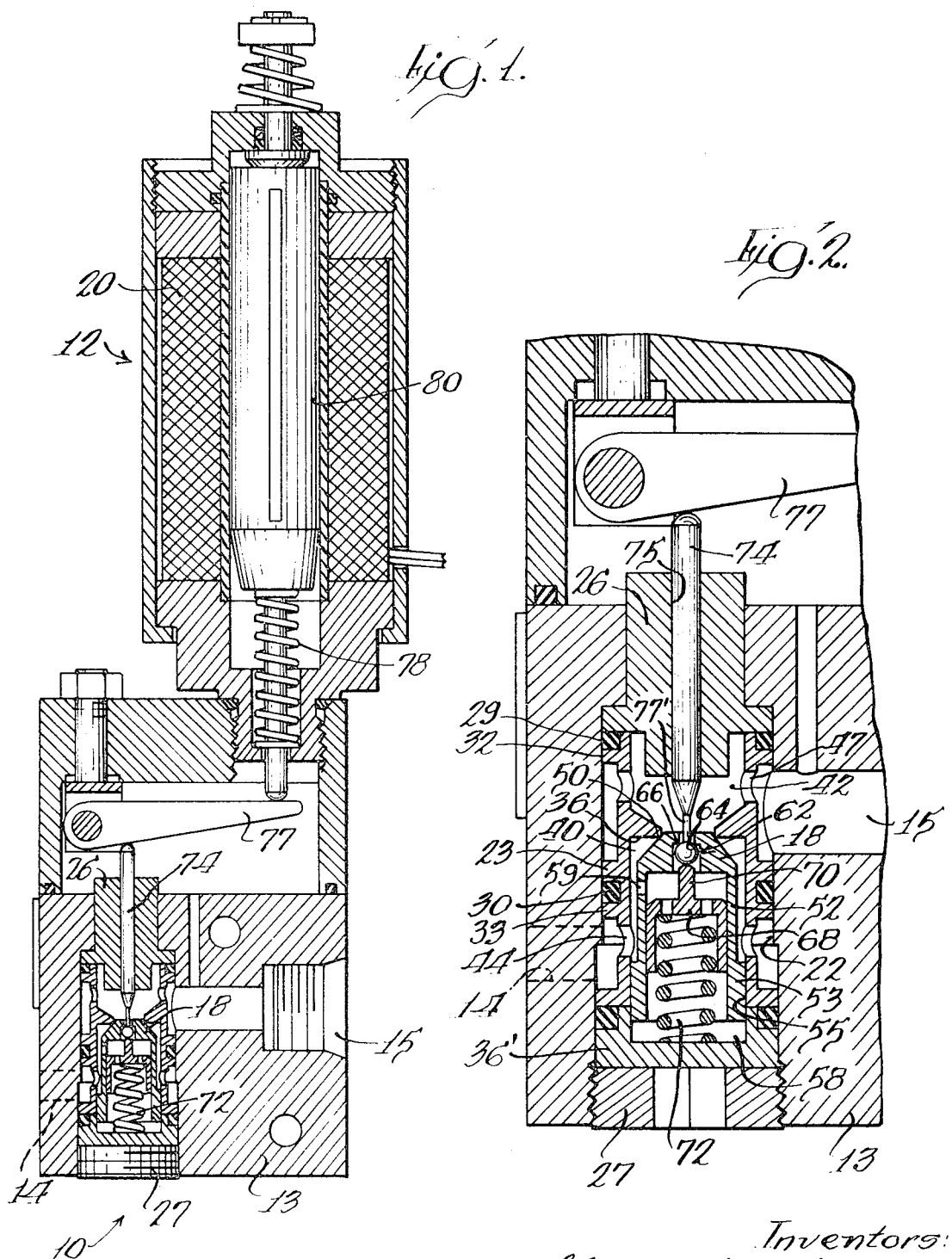
FIG. 1 is a cross section, longitudinally, of the present valve with a linear variable transformer actuator.
FIG. 2 is an enlarged fragmentary section of the valve shown in FIG. 1 without the linear variable transformer.

Referring to the drawings, a proportional flow control valve 10 is provided actuated by a linear variable transformer 12. The flow control valve 10 has a housing 13 defining an inlet passage 14 and an outlet passage 15 between which flow is controlled by a main valve member 18. The valve 10 is constructed such that the valve member 18 will open in an amount proportional to the current supplied to coil 20 in the linear variable transformer 12 to achieve a predetermined desired flow rate from outlet port 15.

Turning to a description of the valve 10 in somewhat more detail, the housing 13 is provided with a stepped bore 22 extending completely therethrough and having a stationary sleeve 23 fixed therein between a bushing 26 and a threaded plug 27 accessible from the exterior of housing 13. Sleeve 23 has seals 29 and 30 defined in annular bosses 32 and 33, respectively. A sealing cap 36' is provided between the sleeve 23 and the threaded plug 27 to prevent the egress of fluid out of bore 22 from the housing 13.

The stationary sleeve 23 has provided integrally therewith a main valve seat 36 which divides the interior of sleeve 23 into inlet chamber 40 surrounding valve member 18 and outlet chamber 42 on the upper side of the valve seat. Inlet chamber 40 communicates continuously with the passage 14 through a plurality of radial ports 44 in sleeve 23, and similarly outlet chamber 42 continuously communicates with outlet passage 15 through radial ports 47 in the valve sleeve. Thus, chamber 40 is always at inlet pressure and chamber 42 in always at outlet pressure.

The main valve member 18 is hollow in construction having an upper conical valving surface 50, a downwardly projecting sleeve portion 52 and an annular piston portion 53 slidable in sleeve bore 55. The hollow interior of valve member 18 defines a chamber 58 that continuously communicates with inlet fluid through orifice 59 formed in the sleeve portion 52 of the valve member 18. Fluid in chamber 58 acts across the entire diameter of valve 18 and tends to close the valve surface against seat 36 of the main valve.

Fluid in chamber 40 acts on an area of the valve between the valve seat 36 at the point of engagement with the valve 18 and the inside diameter of bore 55 producing a force tending to continuously open the valve. Also, spring 72 tends to close the valve by pushing on plunger 68 and ball 62. However, in the absence of other forces the greater effective area of chamber 58 will cause a closure of valve member 18 against seat 36.

For the purpose of proportionally opening the valve member 18 a ball valve 62 is provided to selectively communicate the chamber 58 with the chamber 42 to reduce the pressure differential therebetween and permit proportional valve opening.

Toward this end a stepped central axial passage 64 is provided in the valve member 18 having a shoulder 66 defining a valve seat for ball 62. To bias the ball 62 into engagement with valve seat 66 or plunger 74 a cup-shaped plunger member 68 is provided having a stem portion 70 continuously engageable with ball 62. A coil compression spring 72 seated on sealing cap 36 continuously urges the plunger 68 and stem 70 into engagement with the ball 62 moving it toward its seated position shown in the drawing.

For shifting the ball 62 from its seat 66 in an amount proportional to the opening movement of valve member 18 that is desired, pilot plunger 74 is provided slidable within a bore 75 in bushing 26 and having a reduced stem 77' engageable with the ball 62. Plunger 74 is shifted axially by pivotal lever 77 in turn positioned by a spring biased plunger 78 connected to a movable core 80 in the linear variable transformer 12. The linear variable transformer 12 is constructed to provide a movement of plunger 80 in proportion to the amount of current supplied to coil 20, so that ball 62 will also be shifted an incremental distance proportional to the current supplied to coil 20.

In operation with no current being supplied to the coil 20, pilot ball valve 62 will be in its closed position establishing inlet pressure in chamber 58 as well as chamber 40, and a relatively low pressure to exist in chamber 42. The excess area in chamber 58 over chamber 40 will hold valve 18 tightly in metal-to-metal contact with seat 36.

When current is supplied to coil 20, core 80 shifts downwardly moving plunger 74 downwardly through arm 77 moving ball 62 from its seat 66. This provides communication between chamber 58 and chamber 42 which obviously results in a reduction of pressure in chamber 58 and an increase in pressure in chamber 42, the net effect being a reduction in closing force pressure on the valve 18. Noting that the fluid pressure acting in chamber 40 acts continuously to tend to open the valve member 18, the valve member 18 will open when the orifice defined by ball member 62 is sufficiently large so that the pressure drop between chamber 40 and 58 is greater than a constant (K) multiplied by the pressure drop between the chambers 58 and 42. In equation form the valve 18 will open when $$P_{40}-P_{58}>K(P_{58}-P_{42})$$

where $P_{40}$ is the pressure in chamber 40,
$P_{58}$ is the pressure in chamber 58, and
$P_{42}$ is the pressure in chamber 42.

Expressed more generally and in somewhat different terms the valve 18 will begin opening when the pressure in chamber 58 is reduced sufficiently so that the continuous biasing force in chamber 40 opens the valve 18.

The main body of fluid will then begin to pass from inlet 14 through port 44, chamber 40, across valve seat 36 into chamber 42 and out outlet passage 15. With additional current being applied to coil 20, the ball member 62 will be shifted downwardly an incremental distance its seat increasing the effective orifice and decreasing the pressure drop between chambers 58 and 42. Since the chamber 40 remains the same, this further decrease in differential pressure between chambers 58 and 42 causes the valve member 18 to move downwardly still further until another balanced position is reached where the differential fluid pressure acting on the valve member 18 is balanced and the valve 10 provides a flow proportional to current in coil 20.

When current is removed from coil 20 the spring plunger 78 moves core 80 upwardly permitting the spring 72 to urge the plunger 68 upwardly moving ball 62 to its seated position. The resulting rise in pressure in chamber 58 causes the valve member to close.

While the coil 20 is a "push" coil it is also possible to employ a "pull" coil by suitable linkages associated therewith and the valve action will be reversed rendering it a normally open instead of normally closed valve as will appear to those skilled in this art.

We claim:

1. A proportional flow valve, comprising: housing means, inlet means in said housing means, outlet means in said housing means, a main valve member in said housing means movable from a closed position blocking flow from said inlet means to said outlet means to a plurality of open positions variably communicating said inlet means with said outlet means, said valve member having a first area spaced from the end of the valve member continuously exposed to inlet fluid pressure tending to open the valve member, said valve member having a second area exposed to variable fluid pressure tending to close the valve member, and means for controlling the position of said valve member including valve means for controlling the pressure drop across said valve member, passage means in said valve member, and said valve means including means for variably restricting said passage means to control said pressure drop so that when unrestricted the valve member will move proportionally toward an open position and when the passage means is sufficiently restricted the valve member move toward a closed position, said valve member being constructed to follow movement of said valve means to effect said restriction of the passage means.

2. A proportional flow valve as defined in claim 1, wherein said movable valve member is axially movable and engageable axially with a valve seat in said housing means, said valve member defining a chamber in said housing means, said valve means controlling the pressure in said chamber.

3. A proportional flow valve as defined in claim 1, wherein said passage means is defined axially in said valve member opening to both sides of the valve member said valve means including a ball valve in said passage means, and actuator means for positioning said ball valve in said valve member.

4. A proportional flow valve comprising: housing means, a main valve seat in said housing means, inlet port means communicating with one side of said valve seat, outlet port means communicating with the other side of said valve seat, said seat being defined in a bore in said housing means, a valve member having a piston portion slidable in said bore and defining a chamber therein, port means in valve member communicating said inlet port means with said chamber so that fluid in said chamber tends to close said valve member against said valve seat, said valve member having a surface spaced from the end of the valve member continuously communicating with said inlet port means producing a force tending to open said valve member, and means for opening said valve member including valve means in said valve member selectively communicating said chamber with side of the valve seat communicating with said outlet port means to reduce the pressure in said chamber and hence reduce the closing force on said valve member, said valve member being constructed to follow movement of the valve means and thereby control pressure in said chamber.

5. A proportional flow valve as defined in claim 4, wherein said valve means includes a ball valve slidable in an axial passage in said valve member.

6. A proportional flow valve as defined in claim 5, including an actuator for said valve means movable proportionally to the desired flow rate through the valve member.

7. A proportional flow valve as defined in claim 5, including a biasing plunger slidable in said valve member and biasing said ball valve to a closed position, and actuator means for moving said ball valve to an open position communicating said chamber with the side of the valve seat communicating with the outlet port means.

8. A proportional flow valve comprising: housing means, a main valve seat in said housing means, inlet port means communicating with one side of said valve seat, outlet port means communicating with the other side of said valve seat, said seat being defined in a bore in said housing means, a valve member having a piston portion slidable in said valve bore, a conical seat engaging therein, port means in valve member communicating said inlet port means with said chamber so that fluid in said chamber tends to close said valve member against said valve seat, said valve member having a surface spaced from the end of the valve member continuously communicating with said inlet port means producing a force tending to open said valve member, and means for opening said valve member including valve means in said valve member selectively communicating said chamber with the side of the valve seat communicating with said outlet port means to reduce the pressure in said chamber and hence reduce the closing force on said valve member, said valve means including a second valve member slidable axially in said first valve member, a plunger in said chamber continuously biasing said ball valve to a closed position, and a linear actuator engageable with said ball valve to open the same against the biasing force of said plunger, whereby the valve member follows movement of the valve means and effects variable communication of the inlet port means with the chamber.

9. A proportional flow valve as defined in claim 8, wherein said valve member is hollow and has a piston portion slidable in said valve bore, a conical seat engaging surface on one end of said main valve member.

10. A proportional flow valve as defined in claim 8, including solenoid actuator for said linear actuator.

References Cited
UNITED STATES PATENTS

| | | | |
|---|---|---|---|
| 3,250,294 | 5/1966 | Hipple | 251—30 X |
| 1,826,343 | 10/1931 | Carson, Jr. | 251—38 |
| 2,821,211 | 1/1958 | Wittren | 251—38 X |
| 3,432,140 | 3/1969 | Ray | 251—129 |
| 2,805,039 | 9/1957 | Angelery | 251—38 |

HENRY T. KLINKSIEK, Primary Examiner

D. R. MATTHEWS, Assistant Examiner

U.S. Cl. X.R.

251—38, 129